(12) United States Patent
Hazen et al.

(10) Patent No.: US 6,284,005 B1
(45) Date of Patent: Sep. 4, 2001

(54) SODIUM CARBONATE RECRYSTALLIZATION

(75) Inventors: Wayne C. Hazen, Denver; Dale Lee Denham, Jr., Arvada, both of CO (US); Rudolph Pruszko, Green River, WY (US); David R. Baughman, Golden, CO (US); Ralph B. Tacoma, Evanston, WY (US)

(73) Assignee: Environmental Projects, Inc., Casper, WY (US)

( * ) Notice: Subject to any disclaimer, the term of this patent is extended or adjusted under 35 U.S.C. 154(b) by 0 days.

(21) Appl. No.: 09/239,441

(22) Filed: Jan. 28, 1999

Related U.S. Application Data

(63) Continuation-in-part of application No. 09/225,805, filed on Jan. 5, 1999, now abandoned
(60) Provisional application No. 60/072,805, filed on Jan. 28, 1998.

(51) Int. Cl.$^7$ .................................................. C01D 15/08
(52) U.S. Cl. ...................... 23/302 T; 423/203.2; 423/421
(58) Field of Search ............................... 423/206.2, 421, 423/426; 23/302 T

(56) References Cited

U.S. PATENT DOCUMENTS

| 2,330,221 | 9/1943 | Kermer ................................. 23/295 |
| 2,792,282 | 5/1957 | Pike ...................................... 23/38 |
| 2,962,348 | 11/1960 | Seglin et al. .......................... 23/31 |
| 2,970,037 | 1/1961 | Caldwell et al. ...................... 23/63 |

(List continued on next page.)

FOREIGN PATENT DOCUMENTS

| 661071 | 7/1965 | (BE) . |
| 0073085B1 | 12/1986 | (EP) . |

OTHER PUBLICATIONS

Clay, S.E., "Kinetic Study of the Dissolution of Calcined Trona Ore in Aqueous Solutions", *Minerals and Metallurgical Processing*, Nov. 1985, 236–40.

Muraoka, D., "Monohydrate Process for Soda Ash from Wyoming Trona," *Minerals and Metallurgical Processing*, May 1985, 102–03.

American Society for Testing and Materials, "Standard Test Methods for Chemical Analysis of Soda Ash (Sodium Carbonate)", E–359–90, Mar. 1990, 403–410.

\* cited by examiner

*Primary Examiner*—Stuart L. Hendrickson
(74) *Attorney, Agent, or Firm*—Sheridan Ross P.C.

(57) ABSTRACT

The present invention provides a process for producing sodium carbonate monohydrate crystals by introduction of anhydrous sodium carbonate into a saturated sodium carbonate brine solution under conditions in which sodium carbonate monohydrate formation is favored. As the anhydrous sodium carbonate dissolves, the brine becomes supersaturated resulting in relief of supersaturation by formation of sodium carbonate monohydrate crystals. The process includes controlling supersaturation and its relief to achieve growth of existing sodium carbonate monohydrate crystals rather than nucleation and formation of new sodium carbonate monohydrate crystals. The resulting crystals are separated from insoluble impurities on a size separation basis.

46 Claims, 2 Drawing Sheets

U.S. PATENT DOCUMENTS

| | | | |
|---|---|---|---|
| 3,061,409 | 10/1962 | Robson et al. | 23/63 |
| 3,233,983 | 2/1966 | Bauer et al. | 23/300 |
| 3,236,590 * | 2/1966 | Sopchak et al. | 723/426 |
| 3,244,476 | 4/1966 | Smith | 23/63 |
| 3,273,959 | 9/1966 | Miller | 23/63 |
| 3,314,748 * | 4/1967 | Howard et al. | 423/426 |
| 3,425,795 | 2/1969 | Howard et al. | 23/63 |
| 3,479,133 | 11/1969 | Warzel | 23/63 |
| 3,498,744 * | 3/1970 | Frint et al. | 723/206.2 |
| 3,653,848 | 4/1972 | Port et al. | 23/202 |
| 3,705,790 | 12/1972 | Garofano et al. | 23/302 |
| 3,717,698 | 2/1973 | Ilardi et al. | 423/206 |
| 3,796,794 | 3/1974 | Ilardi et al. | 423/421 |
| 3,819,805 | 6/1974 | Graves et al. | 423/206 |
| 3,836,628 | 9/1974 | Ilardi et al. | 423/206 |
| 3,845,119 | 10/1974 | Duke et al. | 260/527 |
| 3,904,733 | 9/1975 | Gancy et al. | 423/206 |
| 3,933,977 | 1/1976 | Ilardi et al. | 423/206 |
| 3,956,457 | 5/1976 | Port et al. | 423/206 |
| 4,021,527 | 5/1977 | Baadsgaard | 423/206 |
| 4,022,868 | 5/1977 | Poncha | 423/184 |
| 4,083,939 | 4/1978 | Lobunez et al. | 423/421 |
| 4,138,312 | 2/1979 | Gill et al. | 162/30 |
| 4,183,901 | 1/1980 | Ilardi et al. | 423/206 |
| 4,202,667 | 5/1980 | Conroy et al. | 23/302 |
| 4,260,594 | 4/1981 | Verlaeten et al. | 423/421 |
| 4,283,277 | 8/1981 | Brison et al. | 209/166 |
| 4,286,967 * | 9/1981 | Booth et al. | 23/302 T |
| 4,288,419 | 9/1981 | Copenhafer et al. | 423/190 |
| 4,299,799 | 11/1981 | Ilardi et al. | 423/206 |
| 4,374,102 | 2/1983 | Connelly et al. | 423/206 |
| 4,472,280 | 9/1984 | Keeney | 210/666 |
| 4,781,899 | 11/1988 | Rauh et al. | 423/206 |
| 5,300,123 | 4/1994 | Grott | 23/303 |
| 5,396,863 | 3/1995 | Ninane et al. | 117/206 |

SODIUM CARBONATE RECRYSTALLIZATION

CROSS-REFERENCE TO RELATED APPLICATIONS

This application is a continuation-in-part of U.S. patent application Ser. No. 09/225,805, filed Jan. 5, 1999. This application claims priority under 35 U.S.C. §119(e) from U.S. Provisional Application No. 60/072,805, filed Jan. 28, 1998.

FIELD OF THE INVENTION

The present invention relates to the production of sodium carbonate monohydrate crystals from anhydrous sodium carbonate containing impurities.

BACKGROUND OF THE INVENTION

One common method of purifying a compound is to crystallize the compound in a solution. Methods of crystallization typically involve controlling macroscopic external variables such as evaporating solvent to create supersaturation or adjusting the temperature of the solvent to affect solubility. These crystallization methods are generally directed to achieving maximum solids recovery and/or purification without any regard to the size or shape of the crystals.

Therefore, there is a need for a crystallization process that can effectively control or influence the ratio of crystal growth to formation of new crystals at low energy costs.

SUMMARY OF THE INVENTION

The present invention is based on the discovery that sodium carbonate has an unexpectedly high stable supersaturation capacity under appropriate conditions that can be rapidly relieved by the introduction of sodium carbonate monohydrate crystal surfaces to produce relatively large crystals of sodium carbonate monohydrate at high rates of crystal growth. The resulting crystals can be readily separated from insoluble impurities on a size separation basis.

More particularly, the process of the present invention is for producing sodium carbonate monohydrate from a feedstream which includes anhydrous sodium carbonate and insoluble impurities. The process includes adding the feedstream to a saturated sodium carbonate brine solution under conditions to create supersaturation of at least about 5 g/l. The process further includes processing within parameters that preferentially relieve the supersaturation by rapid growth of existing sodium carbonate monohydrate crystals rather than by nucleation. In this manner, the particle size distribution of crystals is controlled to achieve a desired distribution of crystal size product. The sodium carbonate monohydrate crystals produced by the process are recovered from the saturated brine solution.

The process can include the use of a high feed rate of at least about 100 grams of feedstream per minute for each liter of solution in the crystallizer. The process can also include relieving the supersaturation preferentially by rapid growth of existing sodium carbonate monohydrate crystals over nucleation by adding sodium carbonate monohydrate seed crystals to the saturated sodium carbonate brine solution. Such seed crystals can be produced by removing sodium carbonate monohydrate crystals from the brine solution and sizing the removed crystals to produce a seed crystal size fraction for reintroduction to the brine solution. In a preferred embodiment, the particle size of the feedstream is less than about 150 mesh and the particle size of the seed crystals is from about 100 mesh to about 150 mesh.

Relief of supersaturation preferentially by rapid growth of existing sodium carbonate monohydrate crystals over nucleation can alternatively be achieved by a variety of methods. Such methods can include maintaining a solids content of at least about 40% in the crystallizer, agitating the brine solution at an agitation index of at least about 6, periodically lowering the temperature of the brine solution by at least about 5° C., or pausing feedstream addition at least about 60% of the time of crystallization.

Figure 1:
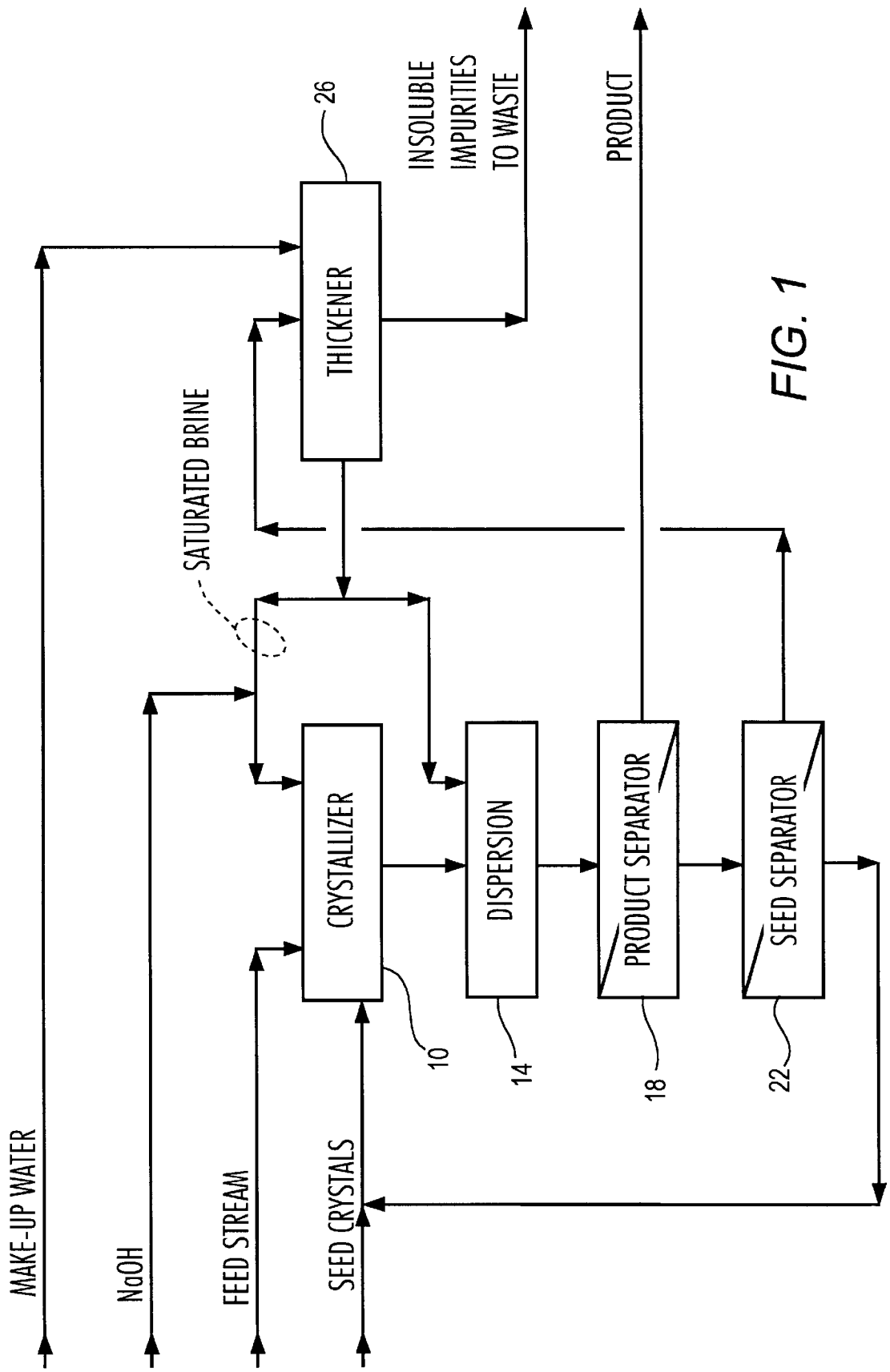
FIG. 1 is a schematic flow diagram of one embodiment of the process of the present invention.

DETAILED DESCRIPTION OF THE INVENTION 1.0 Introduction

The present invention is based in part on the discovery that under certain conditions sodium carbonate has an unexpectedly high stable supersaturation capacity that can be rapidly relieved by the introduction of sodium carbonate monohydrate crystal surface to produce relatively large crystals of sodium carbonate monohydrate at high rates of crystal growth. Significant production efficiencies can be attained at high rates of crystal growth. The resulting crystals can be readily separated from insoluble impurities on a size separation basis. Relief of supersaturation is controlled such that crystal formation primarily occurs on existing crystals, rather than occurring as nucleation or growth of newly formed crystals. In this manner, the particle size distribution of crystals is controlled to achieve a desired distribution of product crystal size.

Processes of the present invention achieve supersaturation of sodium carbonate by adding an anhydrous sodium carbonate feed, e.g., calcined trona, to a saturated sodium carbonate brine solution under temperature conditions in which sodium carbonate monohydrate crystals are formed. Thus, the tendency of the anhydrous sodium carbonate feed to convert to the monohydrate form within the brine solution causes the anhydrous sodium carbonate feed to dissolve, thereby creating supersaturation, before forming sodium carbonate monohydrate. Further, it has been surprisingly found that, under appropriate conditions, sodium carbonate has a supersaturation capacity of about 30 g/l, which is about an order of magnitude higher and more stable in the absence of sodium carbonate monohydrate crystal surfaces than would be expected by one skilled in the art. Therefore, the present invention includes achieving and maintaining high levels of supersaturation near the supersaturation capacity of sodium carbonate to create a high driving force for supersaturation relief which results in rapid crystallization.

Supersaturation created in this manner is relieved by formation of sodium carbonate monohydrate. Sodium carbonate monohydrate can form as a result of exceeding the supersaturation limit, which causes primary nucleation resulting in formation of clouds of small nuclei of sodium carbonate monohydrate. The term "supersaturation limit" is used to describe a condition where the level of supersaturation of sodium carbonate in the brine solution is unstable and results in a relatively spontaneous formation of crystals by primary and/or secondary nucleation. This type of supersaturation relief is unproductive because the small nuclei cannot easily be grown to a size large enough to be separated from insoluble impurities. Supersaturation relief can also occur by growth of existing sodium carbonate monohydrate crystals, which is desired in the present invention.

Processes of the present invention are based on the recognition that since supersaturation is created by the introduction of anhydrous feed, the supersaturation limit can be exceeded in a localized area at the point of introduction of the feed. Therefore, control of supersaturation and its relief in the local environment near where the feed is introduced is critical. The present invention provides the proper thermodynamic environment wherein it is easier to preferentially relieve supersaturation by growth of existing crystals than by nucleation.

Processes of the present invention include a multi-faceted approach to control local supersaturation and its relief to achieve the desired mechanism for supersaturation relief, preferably the growth of existing crystals. One of the elements of processes of the present invention is to use high agitation to rapidly disperse areas of local high supersaturation to avoid exceeding local supersaturation limits, and to bring the surfaces of existing crystals into contact with such areas of supersaturation. The use of high agitation is quite contrary to standard crystallization practice and technology.

Processes of the present invention also provide a large amount of available sites for relief of supersaturation on existing crystals so that if the degree of supersaturation in a localized area is approaching the maximum level, i.e., the supersaturation limit, the supersaturation can be quickly relieved by sodium carbonate monohydrate formation on an existing crystal surface instead of by nucleation. Sites for crystallization are provided by the use of seed crystals and/or by maintaining a high solids content in the crystallizer. The present invention can also include pausing during the introduction of feed to allow for dispersion of local areas of very high supersaturation by agitation and/or productive relief of supersaturation on existing crystals in local areas of very high supersaturation. Control of temperature in the crystallizer is also used to control the rate of relief of supersaturation.

The terms "recrystallization" and "crystallization" are used interchangeably herein and refer to the step of adding anhydrous sodium carbonate to a saturated sodium carbonate brine solution and crystallizing sodium carbonate monohydrate from the saturated brine solution, i.e., the anhydrous sodium carbonate dissolves in the saturated brine solution, forms a supersaturated solution which then causes growth of sodium carbonate monohydrate crystals because the temperature of the saturated brine solution is in the range of sodium carbonate monohydrate stability. A "saturated brine solution" refers to a solution which is saturated with sodium carbonate.

2.0 Feedstream Composition and Introduction 2.1 Composition

As noted above, a feedstream of the present invention comprises anhydrous sodium carbonate. For example, processes of the present invention can be used for purifying anhydrous sodium carbonate (such as calcined trona) containing impurities or for producing dense soda ash from light soda ash. Moreover, the present invention is particularly well adapted for use with feedstreams having high contents of insoluble impurities. In particular, the present invention can be used for purifying anhydrous sodium carbonate feedstreams in which impurities are included within the crystal structure even when the particles are finely ground. Thus, although the present invention can be used with a substantially pure anhydrous sodium carbonate, the present invention is particularly suitable for use with feedstreams having greater than about 15% by weight insoluble impurities, and even more particularly, having greater than about 30% by weight insoluble impurities. Although any anhydrous sodium carbonate including synthetic anhydrous sodium carbonate or calcined trona can be used, processes of the present invention will now be described in detail in reference to purification of calcined trona containing impurities and FIG. 1. And as such, the terms "calcined trona" and "anhydrous sodium carbonate" will hereinafter be used interchangeably.

2.2 Size

As noted, supersaturation is achieved by adding calcined trona to a saturated brine solution under temperature conditions at which sodium carbonate monohydrate forms. Thus, the calcined trona dissolves, thereby creating supersaturation and also releasing impurities, before forming sodium carbonate monohydrate. The rate and completeness of calcined trona dissolving in a saturated brine solution is determined by, among other factors, its particle size. Since the presence of undissolved hydrated calcined trona can compete with seed crystals of monohydrate as a substrate for relieving supersaturation, the calcined trona added to the saturated brine solution should dissolve substantially completely to ensure that the majority of supersaturation relief is by growth of seed crystals, not by growth on undissolved anhydrous feed, and to ensure that at least a portion of impurities present within the crystal lattice of sodium carbonate is released. If the feedstream of calcined trona dissolves only partially, the remaining particles can have undesired effects such as forming agglomerates or relieving supersaturation to form mixed particles of calcined trona and sodium carbonate monohydrate. Thus, to ensure a substantially complete dissolution of the particles the particle size of calcined trona ore in the feedstream, whether in a slurry form or a dry form, is preferably less than about 100 mesh (Tyler), more preferably less than about 150 mesh, still more preferably less than about 200 mesh, and most preferably less than about 400 mesh. It should be appreciated that when the particle size of calcined trona ore is within the above described range, any insoluble impurities present in the calcined trona ore will also be within the confines of the above described particle size.

The above particle size limitations allow calcined trona ore to dissolve relatively quickly and completely in a saturated brine solution in the crystallizer 10.

2.3 Feed Rate

As noted above, it has been surprisingly found that, under appropriate conditions, sodium carbonate has a supersaturation capacity of about 30 g/l, which is about an order of magnitude higher than would be expected by one skilled in the art. Therefore, the present invention includes achieving and maintaining high levels of supersaturation near the supersaturation capacity of sodium carbonate to create a high driving force for supersaturation relief which results in rapid crystallization. For example, the process includes creating supersaturation of at least about 5 g/l, more preferably at least about 10 g/l, more preferably at least about 20 g/l and up to 30 g/l. Supersaturation can be calculated within a localized volume in a crystallizer or within the entire volume of a crystallizer. For example, supersaturation can be calculated as follows. A volume of saturated brine, which can include sodium carbonate monohydrate crystals and calcined trona, can be withdrawn from a crystallization vessel through a screen and filter to remove solid materials. Water in the withdrawn brine is then evaporated and the amount of sodium carbonate per volume of brine can be gravimetrically determined. The amount of sodium carbonate in excess of the known solubility level is the amount of supersaturation. Because of the high capacity for supersaturation and the very rapid relief of supersaturation, the rate of introduction of the feedstream or feed rate can be very high in the present invention. More particularly, the feed rate can be at least about 100 grams per minute for each liter of volume (g/l/min), preferably at least about 200 g/l/min, more preferably at least about 400 g/l/min, and even more preferably at least about 800 g/l/min. These feed rates are significantly higher than feed rates expected to be useful by one skilled in the art and those utilized by previous crystallization methods.

2.4 Method of Introduction

The feedstream, which includes anhydrous sodium carbonate, can be introduced to the saturated brine solution using any of the known methods including by a direct injection, a screw feeder and gravity. The feedstream can be a slurry of anhydrous sodium carbonate in a saturated brine solution or dry anhydrous sodium carbonate.

A dry anhydrous sodium carbonate feedstream must be dispersed and dissolved quickly in the saturated brine solution, otherwise particles may become hydrated and form agglomerates. If the particles in the feedstream are too coarse, they will not dissolve completely, thus possibly reducing the purity of the product; therefore, the particle size of the feedstream should be within the range discussed above. On the other hand, fine particles tend to "float" on top of the saturated brine solution and become hydrated and form agglomerates. Generally, at a high feedstream addition rate discussed above, it is difficult to quickly disperse and dissolve the anhydrous sodium carbonate into the saturated brine solution. It has been found by the present inventors that these problems can be overcome by using high agitation, as discussed below.

One can also avoid these problems, such as agglomerate formation and floatation of fines, by adding a feedstream of anhydrous sodium carbonate in a slurry form. A slurry of anhydrous sodium carbonate can be prepared by mixing calcined trona ore and the saturated sodium carbonate solution at atmospheric pressure and transferring the mixture into a slurry feedstream vessel having a desired temperature at increased pressure. Alternatively, calcined trona ore and the saturated sodium carbonate solution can be fed directly into the slurry feedstream vessel at a desired temperature and pressure to form a slurry feedstream. At a temperature above the transition temperature of sodium carbonate monohydrate to anhydrous sodium carbonate (108.5° C. for a pure system of water and sodium carbonate at one atmosphere of pressure), solids in the slurry include anhydrous sodium carbonate crystals and insoluble materials originally present in the calcined trona ore. It is recognized by those skilled in the art that the transition temperature can be adjusted by various means, including by adding sodium chloride.

Figure 2:
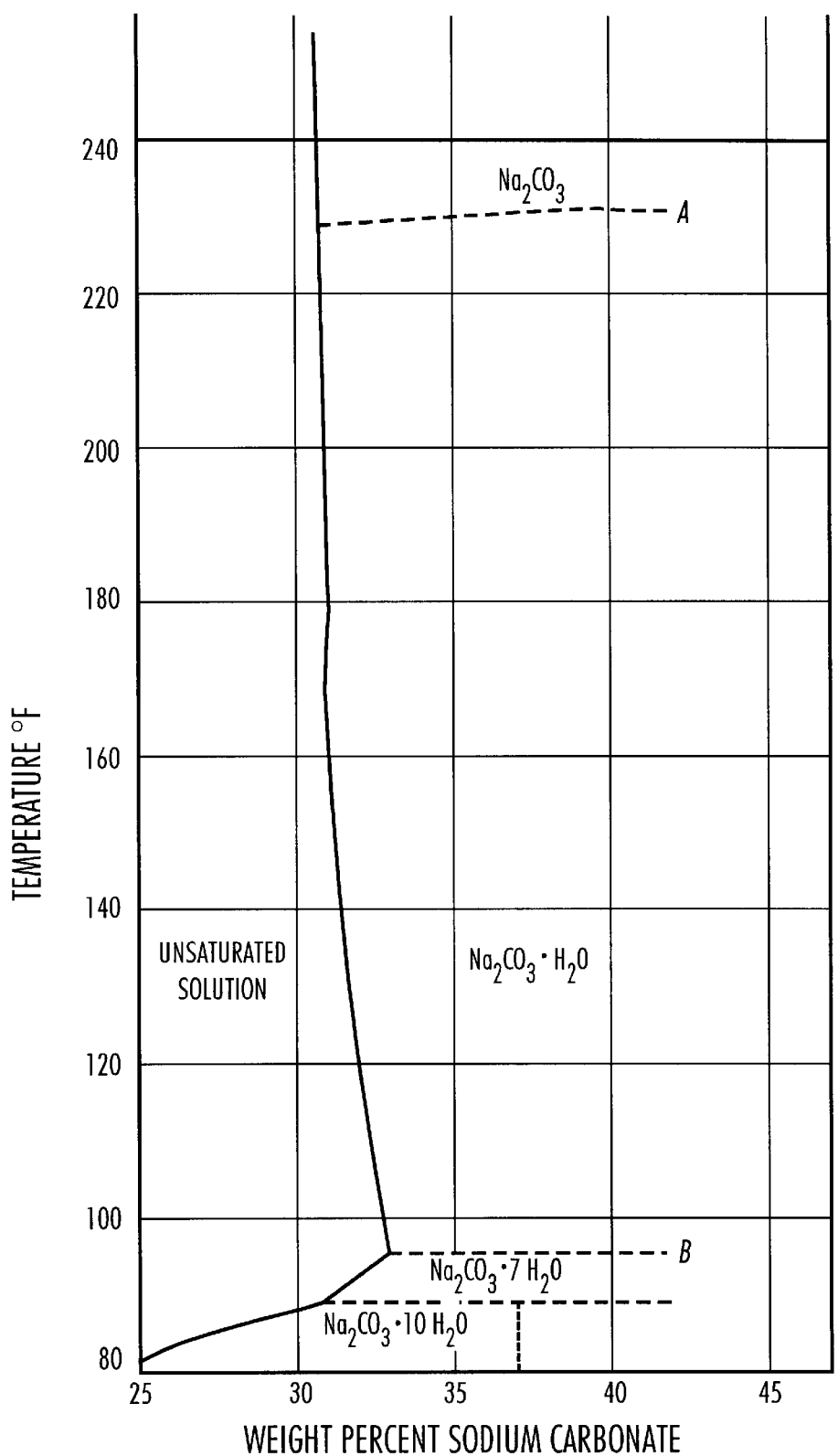
FIG. 2 is a phase diagram for sodium carbonate.

One method of preparing a slurry of feedstream involves mixing anhydrous sodium carbonate with a saturated sodium carbonate brine solution at a temperature at least above the transition temperature of anhydrous sodium carbonate to sodium carbonate monohydrate preferably at least about 5° C. above the transition temperature, and more preferably at least about 2° C. above the transition temperature. A "transition temperature" refers to a temperature at which stable anhydrous sodium carbonate changes its morphology to stable sodium carbonate monohydrate. See for example, line A in FIG. 2, the transition of anhydrous to sodium carbonate monohydrate. Line B in FIG. 2 represents the transition temperature between sodium carbonate heptahydrate and sodium carbonate monohydrate. It will be appreciated that this step of producing a slurry feedstream must be conducted at above atmospheric pressures and must use a feeding mechanism that maintains a continuous pressure seal between the environment of the feed slurry and of the brine solution.

It should be further appreciated that this method of introduction of anhydrous sodium carbonate can be used for processing in any aqueous solution.

2.5 Calcination

When trona is used as a feedstream, it must be converted into anhydrous sodium carbonate by calcination prior to being added to the saturated brine solution. Trona can be calcined using any known calcination technology. For example, calcination can be conducted with a fluidized bed calciner. When a fluidized bed calciner is used to calcine trona ore, the trona ore is comminuted and is generally separated into three size ranges: 6×20 mesh, 20×100 mesh and −100 mesh. Each size can then be separately calcined in a fluidized bed calciner. Calcined trona is then combined and comminuted to provide a feedstream having above mentioned particle size. Further, trona in the feedstream can be calcined using indirect heat calcination as disclosed in commonly assigned U.S. patent application Ser. No. 09/151,694 that was filed on Sep. 11, 1998, which is incorporated herein by reference in its entirety.

3.0 Crystallization

As shown in FIG. 1, a feedstream comprising calcined trona is added to a saturated sodium carbonate brine solution in a crystallizer 10 to generate supersaturation within the saturated brine solution. The feedstream and the saturated brine solution can be added simultaneously and/or sequentially. The present method controls crystallization conditions so that relief of supersaturation created by introduction of the anhydrous sodium carbonate feed primarily occurs on existing sodium carbonate monohydrate crystals rather than by nucleation.

3.1 Seed Crystals

In one embodiment of the present invention, supersaturation relief on existing crystals is achieved by the introduction of seed crystals of sodium carbonate monohydrate to the crystallizer 10. Thus, in contrast to other crystallization methods in which a major amount of crystal growth is by nucleation or on crystals newly formed by nucleation, processes of this particular embodiment of the present invention provide supersaturation relief primarily by growing seed crystals to crystals that are large enough to be separable from insoluble impurities on a size separation basis. Moreover, the size distribution of the product crystal population can also be controlled by adding seed crystals of a desired particle size range. By the use of seed crystals in this manner, crystal growth is productive in the sense that it occurs on crystals which will be large enough to recover on a size separation basis, rather than occurring on small particles which cannot practically be grown large enough to be separated from insoluble impurities.

Seed crystals can be prepared separately or can be prepared as a part of the process flow of the present crystallization process, as described below. For example, seed crystals can be produced by removing crystals from the crystallizer and sizing the crystals to produce a seed crystal size portion for reintroduction to the crystallizer. Furthermore, at least a portion of the product of the present process can be comminuted, e.g., ground, to a desired seed crystal size and used as a source of the seed crystals.

In a batch process, the seed crystals are typically added prior to the addition of the feedstream, whereas in a continuous process, the seed crystals are typically added continuously during the operation of the present invention. As used in this invention, a "continuous addition" can include both non-interrupted addition as well as interval addition throughout the process as needed.

The particle size of the seed crystals is selected such that a product having an acceptable particle size range is produced. For example, the seed crystals need to be large enough that, given the amount of growth achieved in a given crystallization, the resulting product crystals will be large enough to be separable from insoluble impurities on a size separation basis. Preferably, the particle size of the seed crystals is in the range from about 100 mesh (Tyler) to about 400 mesh, more preferably from about 100 mesh to about 200 mesh and most preferably from about 100 mesh to about 150 mesh. Alternatively, the range of the particle size of seed crystals is about 2 standard sieve sizes or less. A "standard sieve size" is denoted by increasing or decreasing the opening in a sieve size by the ratio of the square root of 2 or 1.414, i.e., taking a screen opening and multiplying or dividing it by the square root of 2 or 1.414. The seed crystal size range utilized is determined by the desired product particle size range. For example, a narrow seed crystal size range results in a narrow product particle size range.

The amount of seed crystals and feedstream added to the saturated brine solution depends on the volume of the saturated brine solution in the crystallizer 10. However, as noted below, the total amount of seed crystals and feedstream added to the saturated brine solution typically results in a monohydrate slurry having a solids content in accordance with the parameters discussed below. As used herein, a "monohydrate slurry" refers to a saturated brine solution containing solid sodium carbonate monohydrate crystals. Such a high solids content ensures that sufficient surface area is available for supersaturation relief on existing crystals before any significant amount of nucleation can occur in the brine solution. In another embodiment, for the above mentioned particle sizes of seed crystals and products, the ratio of seed crystals added to the feedstream added is at least about 1:1 by weight, preferably at least about 5:1 by weight, and more preferably at least about 10:1. Generally, about an equal amount of the solids content by weight of the seed crystals and the feedstream is added to the saturated brine solution.

3.2 Solids Content

A further aspect of the present invention to control supersaturation relief on existing crystals of sodium carbonate monohydrate is to maintain a high solids content in the crystallizer 10. In this manner, if the degree of supersaturation in a localized area is approaching the maximum level, supersaturation can be quickly relieved by sodium carbonate monohydrate formation on an existing crystal surface instead of by nucleation. As will be appreciated, the solids content in the crystallizer 10 depends on a variety of factors including the amount of seed crystals added and the amount and solids density of the feedstream added to the saturated brine solution, as well as the desired density for optimal crystallizer operation. These variables are controlled such that the monohydrate slurry has a solids content of at least about 17% by weight, more preferably at least about 35% by weight, even more preferably at least about 40% by weight, and most preferably at least about 60% by weight. Alternatively, the particle surface area density, i.e., the total amount of surface area of crystals present per volume, is at least about 40 cm$^2$/ml, preferably at least about 75 cm$^2$/ml, more preferably at least about 95 cm$^2$/ml, and most preferably at least about 125 cm$^2$/ml.

3.3 Crystallizer Agitation

As noted above, the supersaturation limit of the brine solution can be exceeded in a small localized area because supersaturation is created by the anhydrous feed dissolving to in the saturated brine solution. Therefore, control of supersaturation and its relief in the local environment, for example, by sufficiently high agitation, where the feed is introduced is critical. The term "local" refers to the immediate environment of a small portion of the brine solution in the crystallizer 10 and not the overall amount of sodium carbonate within the total volume of the crystallizer 10. Thus, the term "local supersaturation limit" refers to the degree of supersaturation within any volume of a crystallizer in which formation of a crystal nucleus by primary and/or secondary nucleation can occur. It will be appreciated therefore, that within the crystallizer 10, while the average degree of supersaturation can be below the supersaturation limit, a localized region of high supersaturation can occur and thereby exceed the supersaturation limit in that localized region, resulting in undesired nucleation. To reduce or avoid this undesired nucleation, processes of the present invention can also include control of local supersaturation by using high agitation to rapidly disperse areas of high local supersaturation. High agitation brings the surfaces of existing crystals into contact with areas of high local supersaturation and thereby, increases the effective net surface area available for supersaturation relief by increasing the probability of an existing crystal particle coming into contact with an area of local high supersaturation area. One measure of agitation is a qualitative agitation index as described below. The term "agitation index" refers to a scale of agitation in a crystallizer. An agitation index of 0 means that there is no perceptible stirring or movement within the mixture, whereas an agitation index of 10 means the mixture in the crystallizer is stirred at a very high and rapid degree of mixing and agitation such that degradation or mechanical fracturing of crystals occurs. Table 1 shows the qualitative characteristics of the 0–10 agitation index.

TABLE 1

| Agitation Index | Description |
|---|---|
| 1 | static, no movement or mixing |
| 2 | |
| 3 | turnover of slurry, but not all solids held in suspension |
| 4 | |
| 5 | mild turnover of slurry with all solids held in suspension |
| 6 | |
| 7 | rolling surface with quick turnover and quick absorption of dry material into mass of slurry. |
| 8 | |
| 9 | violent turbulent movement of all slurry in entire vessel |
| 10 | degradation of mechanical fracturing of material |

Preferably, the mixture in the crystallizer 10 is stirred at an agitation index of at least about 4, more preferably at least about 7, still more preferably at least about 8, and most preferably at least about 9.

Evidence of insufficient agitation can be readily determined by examining crystal structures of the product. The product resulting from insufficient agitation may include the presence of agglomerates, long needle-like crystals or dendrites.

In contrast to other methods, agitation in the present invention preferably does not produce a typical vortex associated with using a single propeller non-baffled agitation system. In a particular embodiment of the present invention, agitation of the monohydrate slurry is achieved by using at least two propellers having a counter pitch or other suitable agitation methods including using an attrition scrubber and any other impeller configurations which achieve the desired agitation index discussed above.

Preferably, the solution is agitated at greater than about 10 horsepower/1000 gallons (hp/1000 gal), more preferably at least about 100 hp/1000 gal, and most preferably at least about 200 hp/1000 gal. Alternatively, when a propeller system is used for agitating the monohydrate slurry, the propeller tip speed is at least about 8 feet/sec (ft/sec), preferably at least about 10 ft/sec, and more preferably at least about 22 ft/sec.

Adequate agitation can be achieved by use of any vessel providing agitation as described above. For example, such a vessel can include a one impeller system; two impellers having counter pitch, such as is used in an attrition scrubber; multiple impellers having alternating counter pitch in the crystallizer 10, or other configurations providing the desired agitation index. Thus, in such agitation, it is important to create a rapid exchange of solid particles and the solution portion of the saturated brine solution.

It should be noted, however, that while high agitation is beneficial, it should be conducted in a manner without a significant amount of impact destruction. The term "impact destruction" refers to a process where two or more particles collide and result in a particle size reduction for one or more particles.

3.4 Temperature Control

As discussed above, the temperature of the saturated brine solution is maintained such that the formation of sodium carbonate monohydrate is favored as determined by the phase diagram, as shown in FIG. 2. The temperature of the saturated brine solution in the crystallizer 10 is maintained at between about 40° C. and the transition temperature of anhydrous sodium carbonate to sodium carbonate monohydrate to ensure formation of sodium carbonate monohydrate, preferably between about 70° C. and the transition temperature of anhydrous sodium carbonate to sodium carbonate monohydrate , more preferably between about 90° C. and the transition temperature of anhydrous sodium carbonate to sodium carbonate monohydrate and most preferably between about 98° C. and the transition temperature of anhydrous sodium carbonate to sodium carbonate monohydrate It has been discovered by the present inventors that keeping the temperature in the crystallizer as close as possible to but below the transition temperature of sodium carbonate monohydrate to anhydrous sodium carbonate reduces the "drive", i.e., the rate of conversion, of anhydrous sodium carbonate in the feedstream to change morphologically to sodium carbonate monohydrate. This discovery allows the processes of the present invention to be controlled easily and results in larger, better formed crystals as discussed in detail below.

To maintain a substantially constant temperature of the saturated brine solution within the crystallizer 10, the temperature difference between the saturated brine solution and the feedstream should be small enough such that no significant cooling or heating of the saturated brine solution occurs during the addition of the feedstream. Preferably, the temperature difference between the feedstream and the saturated brine solution is about 20° C. or less, more preferably about 15° C. or less, and most preferably about 10° C. or less.

In another embodiment, the temperature of the dry feed particles in the feedstream is at least about 95° C., preferably at least about 120° C., and more preferably at least about 150° C.

Still in another embodiment, freshly calcined trona can be added directly to the crystallizer 10 along with a saturated brine solution to maintain the temperature of the mixture in the crystallizer 10 as disclosed above. Freshly calcined trona has a high particle temperature as it comes out of the calciner. By adding a freshly calcined, i.e., hot, trona to the saturated brine solution, the amount of energy and the cost required to maintain the mixture at the above described temperature can be significantly reduced compared to processes where calcined trona is reheated prior to being added to the saturated brine solution or where the saturated brine solution is at a higher temperature then the feedstream.

As noted above, the present invention includes controlling supersaturation relief to achieve crystal growth on existing crystals of sodium carbonate monohydrate rather than initiating nucleation. A further aspect of the present invention is the control of supersaturation relief by modifying the temperature of the crystallization solution in a temperature cycling process to control the amount of fines as discussed in more detail below.

3.5 Feed Addition Pause

Crystal formation in the form of nucleation occurs when the local supersaturation level exceeds the supersaturation limit. When the rate of supersaturation generation exceeds the rate of supersaturation relief, eventually the supersaturation level somewhere in the crystallizer will exceed the supersaturation limit resulting in nucleation (sometimes referred to as "snowing-out"). Thus, to prevent the supersaturation level in a local area from exceeding the supersaturation limit, the addition of the feedstream to the saturated brine can be stopped briefly or intermittently to decrease the supersaturation level by allowing growth of existing crystals. More particularly, the break or pause in feedstream addition can be conducted at least about 60% of the time of crystallization. More preferably, the pause can be conducted at least about 30%, and most preferably, at least about 5% of the time of crystallization. For example, if the pause is 10% of the crystallization time, the feedstream would be paused 6 minutes during every hour of operation. It should be noted that when pausing is used, it is preferably conducted frequently, such as by switching between feeding and pausing every several minutes, or about every five minutes.

3.6 Crystal Growth Rate

It is believed that the conventional recommended crystal growth rates for good crystal quality is from about 2 microns/minute to about 5 microns/minute. A "good crystal quality" refers to crystals which are generally hexagonal, roughly equi-dimensional, slightly elongated with an aspect ratio of W×L×H of about 1:1.5:0.75. See for example, Goldschmidt, Atlas der Krystallformen, p. 128 (Carl Winters Universitätbuchhandlung, Heidelberg 1922), which is incorporated herein by reference in its entirety. The crystal growth rate of the present invention is significantly higher than the conventional recommended crystal growth rates while providing a similar crystal quality. Preferably the crystal growth rate of the present invention is at least about 5 microns/minute, more preferably at least about 10 microns/minute, and most preferably at least about 20 microns/minute. It has been found that the crystal growth rate of the present invention does not decrease significantly by having a higher solids to saturated brine solution ratio. However, it is believed the crystal growth rate does depend on the size of the seed crystals. The reason for the higher growth rate of coarser crystals is the mass transfer of sodium carbonate monohydrate crystals from finer crystals to coarser crystals. The operation of this mechanism at high crystal growth rates such as in the current invention is contrary to what would be expected by one of skill in the art.

An average crystal growth rate can be determined by a variety of methods including by a statistical analysis of a sample product crystal. For example, the average crystal growth rate can be obtained by dividing the total amount of crystal growth in the sample by the total crystallization time and the total crystal surface area.

3.7 Nucleation Control

Processes of the present invention involve controlling crystallization conditions as discussed in Sections 3.1–3.6 to provide conditions for relieving the supersaturation in the crystallizer 10 by growing existing crystals rather than by nucleation. If a significant amount of primary and/or secondary crystal nucleation occurs in the crystallizer 10, then a large amount of fines is generated. Production of fines limits productive crystal growth because fines have a large ratio of surface area to volume compared to larger crystals. Since fines are small, even significant growth of them will not make them large enough to be separated from insoluble impurities on a size separation basis. Therefore, such growth is unproductive. However, it should be appreciated that some formation of new crystals by nucleation may be necessary when the process includes generating new seed crystals. Thus, processes of the present invention may be used to allow formation of new crystals by nucleation in a relatively controlled amount for this purpose.

Thus, in a further aspect of the present invention, the amount of solids in the saturated sodium carbonate brine formed by primary and/or secondary nucleation in the crystallizer 10 is maintained at about 10% by weight or less of the total sodium carbonate solids in the saturated brine, more preferably at about 5% by weight or less of the total sodium carbonate solids in the saturated brine, still more preferably at about 1% by weight or less of the total sodium carbonate solids in the saturated brine, and most preferably at about 0.5% by weight or less of the total sodium carbonate solids in the saturated brine. For example, given a defined crystal population at a point in time, one can determine whether new crystals have been formed by primary and/or secondary nucleation by determining whether the crystal population at a later point in time has smaller crystals or an increase in smaller crystals compared to the earlier point in time. One can also determine whether new crystals have been formed by primary and/or secondary nucleation by identifying whether a drop in yield of +200 mesh crystals occurs. One can also determine whether new crystals have been formed by primary and/or secondary nucleation in a continuous process by identifying fluctuations in the size distribution of crystals at a point in time at which a stable population would be expected.

In a further aspect of the invention, control of the crystallization conditions can maintain or reduce the portion of the solid material in the monohydrate slurry which has a small particle size. More particularly, the processes of the present invention can include maintaining the amount of solids in the monohydrate slurry having a particle size of less than about 400 mesh at less than about 10% by weight of the total sodium carbonate solids in the monohydrate slurry, more preferably at less than about 2% by weight of the total sodium carbonate solids in the monohydrate slurry, and most preferably at less than about 0.5% by weight of the total solids in the monohydrate slurry.

3.8 Agglomerate/Aggregate Control

Processes of the present invention for controlling crystallization conditions as discussed above in Sections 3.1–3.6 can also substantially avoid formation of a significant amount of agglomerates and/or aggregates. If a significant amount of agglomerates and/or aggregates are formed, the purity of any recovered product may be significantly decreased because insoluble and soluble impurities can be trapped within the agglomerates and aggregates. Thus, in one aspect of the present invention, the crystallization process is conducted by maintaining the amount of solids in the monohydrate slurry in the form of agglomerates and/or aggregates at about 10% by weight or less of the total sodium carbonate solids in the monohydrate slurry, more preferably at about 5% by weight or less of the total sodium carbonate solids in the monohydrate slurry, and most preferably at about 0.5% by weight or less of the total sodium carbonate solids in the monohydrate slurry.

As used herein, the term "aggregate" refers to a collection of particles or crystals in clusters or clumps. The particles can be held together as a result of the attraction of weak forces, such as van der Waals forces. The term "agglomerate" refers to particles or feed held together by forces stronger than van der Waals forces, which can be formed, for example, by anhydrous feed particles which are not fully dissolved acting as a site for crystallization of monohydrate crystals, or anhydrous feed that was not dispersed or dissolved absorbing water to hydrate.

3.9 Crystallizer Pressure

The crystallizer 10 can be equipped to be operated at a wide range of pressure. In one embodiment, the crystallizer 10 is operated at atmospheric pressure. In another embodiment, the crystallizer 10 can be operated at any desired pressure of up to about 35 pounds per square inch (psia), more preferably up to about 30 psia, and most preferably up to about 25 psia. Unless otherwise noted, the pressure refers to an absolute pressure and not a relative, i.e., gauge, pressure. Whether operated under atmospheric pressure or higher pressure, the temperature of the saturated brine solution in the crystallizer 10 is maintained to favor the formation of sodium carbonate monohydrate. When the crystallizer 10 is operated under pressure, the introduction of the feedstream is preferably at a similar pressure. A pressurized pump such as a Fuller Kinyon pump (not shown) or any other type of pump which can achieve a desired pressure can be used to introduce the dry or slurry feedstream into the crystallizer 10. However, it should be recognized that the feedstream can be at a variety of pressures independent of the crystallization itself.

3.10 Multiple Crystallization Vessels

In a further embodiment, the crystallization is conducted in a series of two or more crystallizers. In this manner, the initial feedstream can be used to generate fines by nucleation in a first crystallizer. The fines are then transferred to a second crystallizer and used as seed crystals for subsequent crystallization where they are grown to a larger size. Thus, in either the second or some subsequent crystallizer, the crystals are grown large enough for a size separation from insoluble impurities. By using a multiple tank system which allows successive crystal growth conditions, the need for a separate seed crystals as discussed above in Section 3.1 can be eliminated.

4.0 Dispersion

Referring again to FIG. 1, at least a portion of sodium carbonate monohydrate crystals and saturated brine solution are separated from the crystallizer 10. The sodium carbonate monohydrate product is eventually recovered in a product separator 18, preferably on a size separation basis. However, as noted above, crystallizations are conducted at high solids content, such as at least about 17% solids content. Product separation with such a viscous mixture can be difficult. Therefore, as shown in FIG. 1, the separation process can also include transferring at least a portion of the monohydrate slurry from the crystallizer 10 to a dispersion tank 14 to decrease the solids content of the monohydrate slurry in order to, inter alia, facilitate the separation process. It should be noted that the dispersion step should not dilute the solution below saturation. Otherwise, product loss can occur by dissolution of product. Typically, a saturated brine solution having a substantially negligible solids content is added to the dispersion tank 14 to reduce the solids content of the monohydrate slurry to about 25% by weight or less, more preferably to about 15% by weight or less solids content, and most preferably to about 10% by weight or less solids content.

5.0 Recovery

The present invention also includes recovering product from the monohydrate slurry. The recovery process can include separating a particular particle size range of sodium carbonate monohydrate crystals from the monohydrate slurry. Size separation is conducted in a separation apparatus 18 and can be affected by any of the appropriate known methods. For example, screening, cyclones (such as hydrocyclones) or elutriation can be used.

The sodium carbonate monohydrate crystal product which is recovered typically has a particle size of greater than at least about 150 mesh. Preferably, the product has a particle size of greater than at least about 100 mesh, and more preferably greater than at least about 80 mesh. More particularly, the size cutoff for product recovery has to be at least as large as or larger than the particle size of the feed so that insoluble impurities initially in the feed are not recovered with product.

Separation of sodium carbonate monohydrate crystals is generally conducted by screening or cycloning and avoiding drying of the crystals. Drying of the crystals at this stage may result in cementing, or agglomerate formation, of crystals and/or impurities, thereby reducing the purity of the product (but not the purity of the crystals). Drying of the crystals can be avoided or reduced by reducing or eliminating evaporation of the solvent, or by covering the screen with solvent or solvent vapors to maintain solvent saturation. Alternatively, a pressurized and/or submerged size separation process can be used, which ensures that local evaporation of solvent is minimized or eliminated.

Once sodium carbonate monohydrate crystals are separated from the saturated brine solution, they can be dehydrated (i.e., dried) using known techniques to provide anhydrous sodium carbonate.

The purity of crystals produced by the processes of the present invention is at least about 99%, more preferably at least about 99.5% and most preferably at least about 99.8%. The term "purity of product" refers to the overall purity of the product and can include impurities which can be present on the surface of the crystals or which can be trapped within agglomerates. The term "purity of crystals" refers to the presence or lack of impurities within the crystal lattice structure. In other words, the purity of product refers to the purity of a particular batch of the product produced by the process of the present invention, whereas the purity of crystals refers to the purity of crystals within the product.

5.1 Physical Property of the Product

Unlike some of the current crystallization processes, the process of the present invention does not utilize a crystal modifier to affect the crystal shape of the product. The majority of the product is block-like in shape, as discussed above, and is surprisingly resistant to abrasion. Preferably at least about 55% of the particles in the product is block-like in shape, more preferably at least about 75%, and most preferably at least about 95%.

It is believed that these block-like crystal are responsible for a high bulk density observed in the product of the present invention. The product of the present invention has a poured bulk density of at least about 0.95 g/ml, preferably at least about 1.0 g/ml, and more preferably at least about 1.1 g/ml. In another embodiment of the present invention, the product has a packed density of at least about 1.0 g/ml, preferably at least about 1.1 g/ml, and more preferably at least about 1.2 g/ml.

The product of the present invention also has a lower amount of dust, i.e., fines, than crystals produced by the conventional crystallization processes. Without being bound by any theory, this low amount of dust present in the product is believed to be due to a variety of novel features of the present invention including the use of seed crystals, the relief of supersaturation primarily by crystal growth rather than by formation of new crystals, and the block-like shape of the product crystals which is more resistance to abrasion than other crystal shapes.

The product of the present invention has improved flowability and decreased bridging compared to products produced by conventional methods. It is believed the block-like crystal shape and the absence of fine crystals produces higher flowability and lower bridging in storage vessels. This block-like crystal shape has smoother crystal surfaces compared to other crystal shapes such as jack-like or needle like crystal shapes. Without being bound by any theory, it is believed that the smooth surface of block-like shaped crystals has a lower frictional force than other crystal shapes. In addition, larger particles have a reduction in specific surface area, and thereby the cohesiveness between particles is reduced.

6.0 Seed Separation

Again referring to FIG. 1, an undersize fraction of the monohydrate slurry from the product separator 18 can be transferred to a seed crystal separation apparatus 22 to separate at least a portion of crystals from the undersize fraction for use as seed crystals. The undersize fraction will include sodium carbonate monohydrate crystals smaller than the size cutoff in the product separator 18 and insoluble impurities. To effectively produce a seed crystal population, the undersize fraction from the product separator 18 must include an upper size range which is larger than the size of the insoluble impurities. In this manner, by conducting a size separation in the seed separator 22, seed crystals which are free of insoluble impurities can be recovered as an oversize fraction, and the insoluble impurities with small sodium carbonate monohydrate crystals are generated as the undersize fraction. The seed crystal separation can be accomplished by any of the appropriate known methods as discussed above. As discussed above, a seed crystal population produced in this manner is then used in a crystallizer.

Other methods of producing seed crystals include the following: wet comminution of monohydrate crystals; dry comminution of monohydrate crystals; dissolution of a portion of monohydrate crystals by water addition; dissolution of crystal in a slurry by cooling the slurry to increase the solubility of sodium carbonate in the brine; and controlled cooling of a slurry of anhydrous sodium carbonate.

7.0 Thickening

The undersize fraction from the seed separator 22, containing saturated brine solution, insoluble impurities and/or sodium carbonate monohydrate crystals which are smaller than the desired seed crystal size is then further processed. As shown in FIG. 1, the undersized fraction from the seed separator 22 is transferred to a thickener 26 to allow for settling of insoluble impurities. The settled insoluble impurities are then purged from the system, while the clear overflow and/or the resulting clarified saturated brine solution can be recycled and reused. It should be appreciated that during the settling process, the brine solution can be diluted with water or a non-saturated brine solution to dissolve fine sodium carbonate monohydrate crystals which may be present. Furthermore, makeup water can be added as required by the overall mass balance of the system.

Prior to being purged from the system, settled insoluble impurities can be further concentrated, e.g., by filter press, to recover at least a portion of the saturated brine solution. In addition, the clear overflow and/or the clarified saturated brine solution can be further clarified by filtration to remove any fine insoluble impurities that may be present.

When the saturated brine solution is reused, it is desirable that the temperature of the saturated brine solution in the thickener is kept at no more than about 20° C. different than the temperature of the saturated brine solution in the crystallizer tank to minimize the energy cost of reheating the saturated brine solution from the thickener. Preferably, the difference in temperature between the saturated brine solution and the saturated brine solution in the crystallizer tank is about 15° C. or less, more preferably about 10° C. or less, and most preferably about 5° C. or less.

8.0 Bicarbonate Control

It has been found that the crystal size and/or the shape can be affected by the presence of sodium bicarbonate in the saturated brine solution. Therefore, the process of the present invention can further include maintaining the concentration of sodium bicarbonate below about 10 g/l in the saturated brine solution which is added to the crystallizer 10, more preferably below about 5 g/l, and most preferably about 0 g/l. Larger sodium carbonate crystals can be grown in crystallization processes when the amount of bicarbonate present in the brine solution is maintained within these limits. One method of controlling the sodium bicarbonate level in the saturated brine solution is disclosed in a commonly assigned, U.S. patent application Ser. No. 09/167, 627, filed on Oct. 6, 1998, which is incorporated by reference herein in its entirety.

A further advantage of the present process which has been recognized is that, in the absence of bicarbonate, crystals which are grown have a more beneficial shape, e.g., a well-formed block-like shape. In contrast, crystals grown in the presence of significant amounts of sodium bicarbonate can have a needle-like, dendritic or jack-shaped structure and/or cloudy centers. Thus, crystals produced in accordance with the present invention, having a more compact and block-like shape, produce a material having a higher bulk density and a lower friability than those produced in the presence of a relatively large amount of bicarbonate.

In a preferred embodiment of the present invention, a sufficient amount of base is used to reduce the concentration of sodium bicarbonate to within the parameters discussed above. Preferably, after neutralizing any initial sodium bicarbonate in the crystallizer, base is added to the crystallization process to maintain a concentration of at least about 0.75 mole/l of equivalent base, more preferably at least about 0.50 mole/l, and most preferably at least about 0.25 mole/l. When sodium hydroxide is used as the base, after neutralizing any initial sodium bicarbonate in the crystallizer, the amount of sodium hydroxide used is preferably at least about 6 g/l, more preferably at least about 4 g/l, and most preferably at least about 2 g/l.

9.0 Aging

Processes of the present invention can also include transferring at least a portion of the monohydrate slurry from the crystallizer 10 and/or at least a portion of the screened saturated brine solution into an aging apparatus (not shown). The aging apparatus allows growth of at least a portion of the crystals in the saturated brine solution by dissolving at least a portion of fines and then promoting crystal growth by relieving the supersaturation in the form of a crystal growth, i.e., some mass of fine particles is converted to coarse particles by a process of dissolving and recrystallizing.

As used in this invention, "aging" refers to a process of dissolving some of the small crystals present in the saturated brine solution and relieving at least a portion of the supersaturation by growth on existing crystals. The aging can be a natural equilibrium phenomena where crystals are constantly being dissolved and recrystallized or it can be achieved by diluting and concentrating the saturated brine solution or simply by a temperature cycling process. The aging process can be used to produce seed crystals or to increase the amount and/or the size of the product. For example, when the temperature of the saturated brine solution in the crystallizer 10 is from about 80° C. to about 90° C., it has been observed that by allowing the resulting saturated brine solution to stir or stand for an additional about 10 to about 15 minutes after the addition of the feedstream and/or the seed crystals, the amount and/or the size of larger sodium carbonate monohydrate crystals can be significantly increased. This phenomena occurs at faster rates at increased temperatures.

The temperature cycling process involves reducing the temperature of the saturated brine solution at least about 10° C., more preferably at least about 20° C., and most preferably at least about 40° C. Alternatively, the temperature of the saturated brine solution is reduced to less than about 70° C., more preferably less than about 60° C., and most preferably less than about 50° C., but always above 35° C., the top of stability range for sodium carbonate decahydrate. As FIG. 2 shows, the solubility of sodium carbonate increases as the temperature is reduced. Thus, reducing the temperature of the saturated brine solution dissolves at least a portion of the sodium carbonate monohydrate crystals. It should be appreciated that while some fines may be completely dissolved, some larger crystals may also be partially dissolved during the temperature cycling process. When the temperature of the saturated brine solution is increased, the solubility of sodium carbonate decreases as shown in FIG. 2. This reduction in solubility causes relief of supersaturation of the brine solution by growth of existing crystals or by primary and/or secondary nucleation. By maintaining a condition which limits the amount of primary and/or secondary nucleation as discussed above, the amount of fines generated can be reduced and the crystal sizes can be increased using an aging process.

As stated above, temperature cycling process can be applied to the entire monohydrate slurry in the crystallizer or to a slip stream, i.e., a portion, of the monohydrate slurry such that a portion of the monohydrate slurry is cycled through an external heat exchanger to reduce the temperature of the monohydrate slurry.

When the temperature cycling is applied to the entire monohydrate slurry as a whole, the process is typically performed by cycling the crystallizer's temperature about once an hour. If the temperature cycling is affected to a portion of the monohydrate slurry through an external heat exchanger, such temperature cycling is conducted on a continuous basis while a portion of the monohydrate slurry is continuously circulated through the heat exchanger. In one particular embodiment of a temperature cycling process, a heat exchanger is used for the temperature cycling process. In this embodiment, the temperature of the monohydrate slurry is typically lowered by at least about 5° C., more preferably at least about 10° C., and most preferably at least about 20° C.

10.0 Fines Scavenging

As a means for improving the product yield, the slurry of fine particles remaining after the product size monohydrate crystals have been removed can be further processed to recover the soda ash values present in the slurry of fines. The slurry of fines can also include impurities which were present in the feedstream and any fine sodium carbonate monohydrate crystals which are smaller than the product size. One technique for processing the slurry of fines to improve the product yield is to use a pressure slurry system as described below.

10.1 Pressure Slurry System Crystallization

In this process, the slurry of fines is thickened to a relatively high solids content, preferably to at least about 17% solids by weight, more preferably to at least about 25% solids by weight, even more preferably to at least about 40% solids by weight, and most preferably to at least about 60% solids by weight. The slurry of fines can be thickened by a conventional gravity thickener, a membrane filter, or any suitable device that permits decanting saturated brine from the slurry of fines while retaining the solids.

The thickened slurry of fines is then pumped into a pressure vessel operating above the transition temperature of monohydrate sodium carbonate to anhydrous sodium carbonate. In general, this vessel is operated at a temperature of at least about 7° C. above the transition temperature. In the pressure vessel, the incoming slurry is heated above the transition temperature of monohydrate sodium carbonate to anhydrous sodium carbonate. This heating converts sodium carbonate monohydrate to anhydrous sodium carbonate. The resulting anhydrous sodium carbonate slurry is then added to the feedstream or to the crystallizer directly. In this manner, the slurry of sodium carbonate monohydrate fines is recycled to the crystallization process of the present invention to increase the amount of sodium carbonate recovery.

Depending on the yield of each stage of crystallization, a pressure slurry system for fines scavenging can be repeatedly used. Because the operating and capital costs in each stage of crystallization processes of the present invention are relatively low, having a multiple stage pressure crystallization process can be readily justified economically. The use of a multiple stage crystallization process increases the yield of sodium carbonate from a depletable resource such as trona.

11.0 Product Purity Control

Although processes of the present invention provide product crystals of a purity level as described above, in some cases, such as when soluble impurities are present in the feedstream, it may be necessary to utilize a multiple stage crystallization process to achieve the product having the above described purity level.

Crystals are produced in a first stage of crystallization. These crystals are mechanically dewatered and repulped in brine from a second stage of crystallization in the process. This repulped slurry is fed to the second stage pressure slurry crystallization system as described above. The recrystallization that takes place in this second stage will produce crystals containing less soluble impurities than were present in the product of the first stage recrystallization. This process can be repeated with as many stages as are required to get the desired purity levels.

The following example is provided for purposes of illustration and is not intended to limit the scope of the present invention.

EXAMPLE 1

This example illustrates the high capacity for supersaturation of sodium carbonate and a technique for measuring the same.

A four liter vessel with intense agitation was partially filled with a slurry of 65×100 mesh sodium carbonate monohydrate seed crystals and heated to 88° C. Minus 150 mesh calcined trona, heated to 125° C. was added rapidly to the vessel. Immediately after addition of the calcined trona was complete, the concentration of dissolved sodium carbonate in the brine was determined by withdrawing the brine through a screen and filter to exclude seed crystals and calcined trona. Water was evaporated from the withdrawn brine to produce a solid residue. The quantity of sodium carbonate per gram of withdrawn brine was gravimetrically determined. The quantity of sodium carbonate in excess of the solubility limit of sodium carbonate is the amount of supersaturation. A second sample was taken 5 minutes after feed addition was complete to evaluate the amount of supersaturation at that time and the amount of relief of supersaturation in the 5 minute interval.

Three tests were run with the amount of feed being varied. The amount of feed added, the time of addition, the percent solids, and the amount of supersaturation at 0 minutes and at 5 minutes are shown below in Table 2.

TABLE 2

| Test # | Feed (g/l) | Time to Add Feed (seconds) | % Solids at End | Grams/liter Supersaturation | |
|---|---|---|---|---|---|
| | | | | 0 min. | 5 min. |
| 1 | 30 | 10 | 12.2 | 15.8 | 7.1 |
| 2 | 60 | 10 | 15.7 | 22.5 | 5.9 |
| 3 | 120 | 15 | 25.5 | 26.3 | 1.5 |

The results in Table 2 illustrate that high levels of supersaturation can be obtained by practice of the present invention. For example, in Test No. 3, supersaturation of 26.3 g/l was present at the end of the feed addition. The results further illustrate that the supersaturation is rapidly relieved. For example, in Test No. 3, the amount of supersaturation at the end of feed addition went from 26.3 g/l to 1.5 g/l at 5 minutes after the end of feed addition.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A process for producing sodium carbonate monohydrate from a feedstream comprising anhydrous sodium carbonate and impurities, the process comprising:

(a) adding the feedstream to a saturated sodium carbonate brine solution at a rate of at least about 100 g/l/min under conditions to create supersaturation of at least about 5 g/l;

(b) processing within parameters that preferentially relieve the supersaturation by rapid growth of existing sodium carbonate monohydrate crystals over nucleation; and (c) recovering at least a portion of the sodium carbonate monohydrate crystals from the saturated brine solution.

2. The process of claim 1, wherein the supersaturation is at least about 10 g/l.

3. The process of claim 1, wherein the supersaturation is at least about 20 g/l.

4. The process of claim 1, wherein the feedstream is produced by a process comprising mixing anhydrous sodium carbonate with a saturated sodium carbonate brine solution at a temperature above the transition temperature between sodium carbonate monohydrate and anhydrous sodium carbonate.

5. The method of claim 4, wherein the aqueous solution is at above atmospheric pressure and at a temperature above the atmospheric boiling point of the aqueous solution and wherein the feed slurry is introduced by a feeder that maintains a continuous pressure seal between the environment of the feed slurry and of the aqueous solution.

6. The process of claim 1, wherein the step of relieving the supersaturation preferentially by rapid growth of existing sodium carbonate monohydrate crystals over nucleation comprises adding sodium carbonate monohydrate seed crystals to the saturated sodium carbonate brine solution.

7. The process of claim 6, wherein the seed crystals are produced by removing sodium carbonate monohydrate crystals from the brine solution and sizing the removed crystals to produce a seed crystal size fraction for reintroduction to the brine solution.

8. The process of claim 6, wherein the particle size of the feedstream is less than the particle size of the seed crystals.

9. The process of claim 6, wherein the range of the particle size of the seed crystals is not greater than about 3 standard sieve sizes.

10. The process of claim 6, wherein the particle size of the feedstream is less than about 150 mesh.

11. The process of claim 6, wherein the particle size of the seed crystals is from about 100 mesh to about 150 mesh.

12. The process of claim 1, wherein the step of relieving the supersaturation preferentially by rapid growth of existing sodium carbonate monohydrate crystals over nucleation comprises maintaining a solids content of at least about 17%.

13. The process of claim 1, wherein the step of relieving the supersaturation preferentially by rapid growth of existing sodium carbonate monohydrate crystals over nucleation comprises agitating the brine solution at an agitation index of at least about 4.

14. The process of claim 1, wherein the step of relieving the supersaturation preferentially by rapid growth of existing sodium carbonate monohydrate crystals over nucleation comprises periodically lowering the temperature of the brine solution by at least about 5° C.

15. The process of claim 1, wherein the step of relieving the supersaturation preferentially by rapid growth of existing sodium carbonate monohydrate crystals over nucleation comprises pausing feedstream addition at least about 60% of the time of crystallization.

16. The process of claim 1, wherein the step of relieving the supersaturation preferentially by rapid growth of existing sodium carbonate monohydrate crystals over nucleation comprises pausing feedstream addition at least about 30% of the time of crystallization.

17. The process of claim 1, wherein the step of relieving the supersaturation preferentially by rapid growth of existing sodium carbonate monohydrate crystals over nucleation comprises pausing feedstream addition at least about 5% of the time of crystallization.

18. The process of claim 1, wherein the amount of solids in the brine solution formed by primary and/or secondary nucleation in the crystallizer is maintained at about 20% by weight or less of the total sodium carbonate solids in the brine solution.

19. The process of claim 1, wherein the amount of solids in the brine solution having a particle size of less than about 400 mesh is maintained at less than about 25% by weight of the total sodium carbonate solids in the brine solution.

20. The process of claim 1, wherein the amount of solids in the brine solution in the form of agglomerates and/or aggregates is maintained at about 20% by weight or less of the total sodium carbonate solids in the brine solution.

21. The process of claim 1, wherein the step of recovering comprises removing a portion of the sodium carbonate monohydrate crystals from the brine solution, dispersing the sodium carbonate monohydrate crystals by the addition of brine solution and recovering sodium carbonate monohydrate crystals from insoluble impurities on a size separation basis.

22. The process of claim 1, wherein the temperature of the saturated brine solution is at least about 70° C.

23. The process of claim 1, wherein the saturated sodium carbonate brine solution is at a temperature above the atmospheric boiling point of the solution.

24. The process of claim 1, wherein said feedstream comprises calcined trona.

25. The process of claim 1, further comprising agitating the brine solution at an agitation index of at least about 7.

26. The process of claim 1, further comprising agitating the brine solution at an agitation index of at least about 9.

27. The process of claim 1, further comprising agitating the brine solution at greater than about 10 hp/1000 gal.

28. The process of claim 1, further comprising agitating the brine solution at greater than about 100 hp/1000 gal.

29. The process of claim 1, further comprising agitating the brine solution at greater than about 200 hp/1000 gal.

30. The process of claim 4, wherein said feedstream comprises calcined trona.

31. A process for producing sodium carbonate monohydrate from a feedstream comprising anhydrous sodium carbonate and impurities, the process comprising:
  (a) adding the feedstream to a saturated sodium carbonate brine solution at a rate of at least about 100 g/l/min under a condition to create supersaturation of at least about 5 g/l;
  (b) processing within a parameter that preferentially relieve the supersaturation by rapid growth of existing sodium carbonate monohydrate crystals over nucleation, wherein the step of relieving comprises adding sodium carbonate monohydrate seed crystals to the saturated sodium carbonate brine solution, maintaining a solids content of at least about 40% and agitating the brine solution at an agitation index of at least about 4; and
  (c) recovering a portion of the sodium carbonate monohydrate crystals from the saturated brine solution, wherein said recovering step comprises removing a portion of the sodium carbonate monohydrate crystals from the brine solution, dispersing the sodium carbonate monohydrate crystals by the addition of brine solution and recovering sodium carbonate monohydrate crystals from insoluble impurities on a size separation basis.

32. The process of claim 31, wherein said feedstream comprises calcined trona.

33. The process of claim 31, wherein the seed crystals are produced by removing sodium carbonate monohydrate crystals from the brine solution and sizing the removed crystals to produce a seed crystal size fraction for reintroduction to the brine solution.

34. The process of claim 31, wherein the particle size of the feedstream is less than the particle size of the seed crystals.

35. The process of claim 31, wherein the range of the particle size of the seed crystals is not greater than about 3 standard sieve sizes.

36. The process of claim 31, wherein the particle size of the feedstream is less than about 150 mesh.

37. The process of claim 31, wherein the particle size of the seed crystals is from about 100 mesh to about 150 mesh.

38. The process of claim 31, wherein the step of relieving the supersaturation preferentially by rapid growth of existing sodium carbonate monohydrate crystals over nucleation further comprises periodically lowering the temperature of the brine solution by at least about 5° C.

39. The process of claim 31, wherein the step of relieving the supersaturation preferentially by rapid growth of existing sodium carbonate monohydrate crystals over nucleation comprises pausing feedstream addition at least about 60% of the time of crystallization.

40. The process of claim 31, wherein the amount of solids in the brine solution formed by primary and/or secondary nucleation in the crystallizer is maintained at about 20% by weight or less of the total sodium carbonate solids in the brine solution.

41. The process of claim 31, wherein the amount of solids in the brine solution having a particle size of less than about 400 mesh is maintained at less than about 25% by weight of the total sodium carbonate solids in the brine solution.

42. The process of claim 31, wherein the amount of solids in the brine solution in the form of agglomerates and/or aggregates is maintained at about 20% by weight or less of the total sodium carbonate solids in the brine solution.

43. The process of claim 31, wherein the saturated sodium brine solution is at a temperature above the atmospheric boiling point of the solution.

44. A process for producing sodium carbonate monohydrate from a feedstream comprising anhydrous sodium carbonate and impurities, the process comprising:

(a) adding a feedstream having a particle size of less than about 100 mesh to a saturated sodium carbonate brine solution at a rate of at least about 400 g/l/min under a condition to create supersaturation of at least about 5 g/l;

(b) processing within a parameter that preferentially relieve the supersaturation by rapid growth of existing sodium carbonate monohydrate crystals over nucleation, wherein the parameter comprises adding sodium carbonate monohydrate seed crystals having a particle size of from about 150 mesh to about 100 mesh to the saturated sodium carbonate brine solution, maintaining a solids content of at least about 60% and agitating the brine solution at an agitation index of at least about 4; and (c) recovering a portion of the sodium carbonate monohydrate crystals from the saturated brine solution, wherein said recovering step comprises removing a portion of the sodium carbonate monohydrate crystals from the brine solution, dispersing the sodium carbonate monohydrate crystals to a solids content of less than about 25% by weight by the addition of brine solution and recovering sodium carbonate monohydrate crystals having a particle size of greater than at least about 100 mesh from insoluble impurities on a size separation basis.

45. The process of claim 44, wherein the particle size of said feedstream is less than about 150 mesh.

46. The process of claim 44, wherein the saturated sodium carbonate brine solution is at a temperature above the atmospheric boiling point of the solution.

* * * * *